Aug. 11, 1936.  M. FLEISCHER  2,050,697
PICTURE APPARATUS
Filed June 29, 1932   4 Sheets-Sheet 3
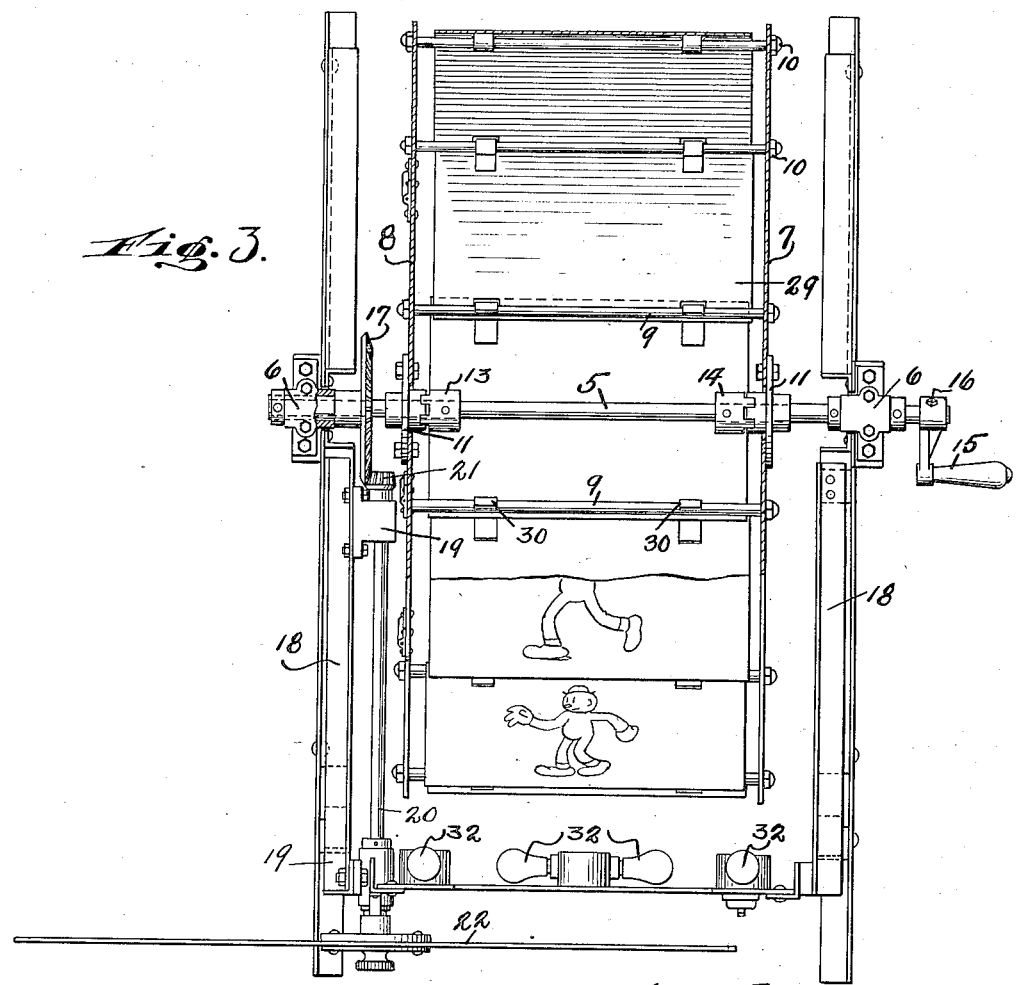
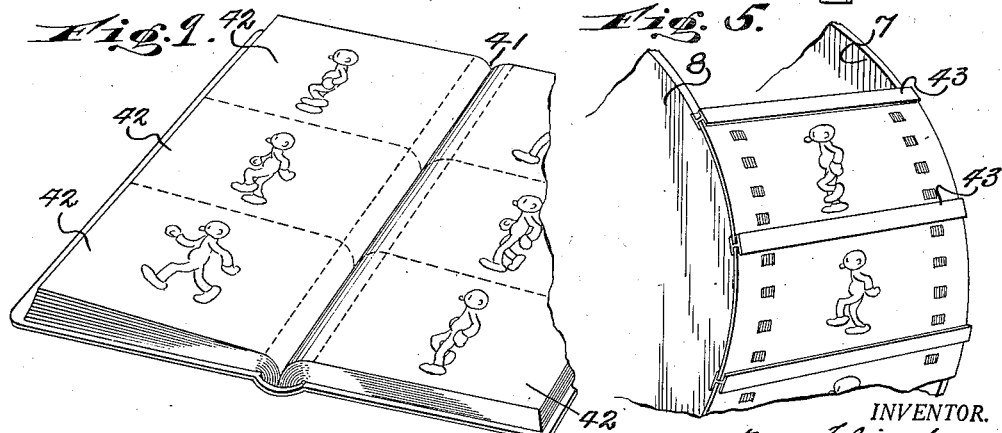
INVENTOR.
Max Fleischer.
BY
Liddle, Margeson and Varnidge.
ATTORNEYS.

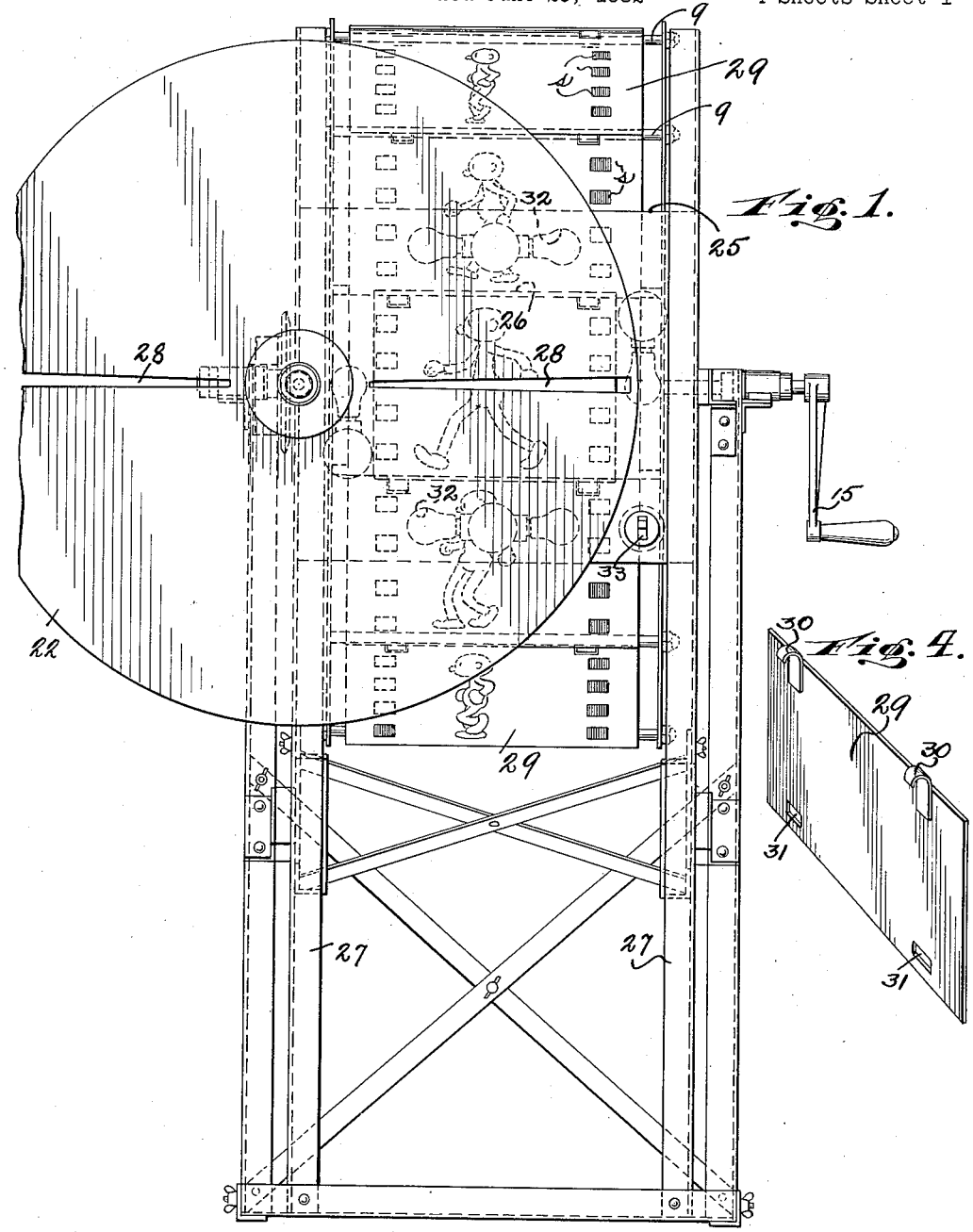

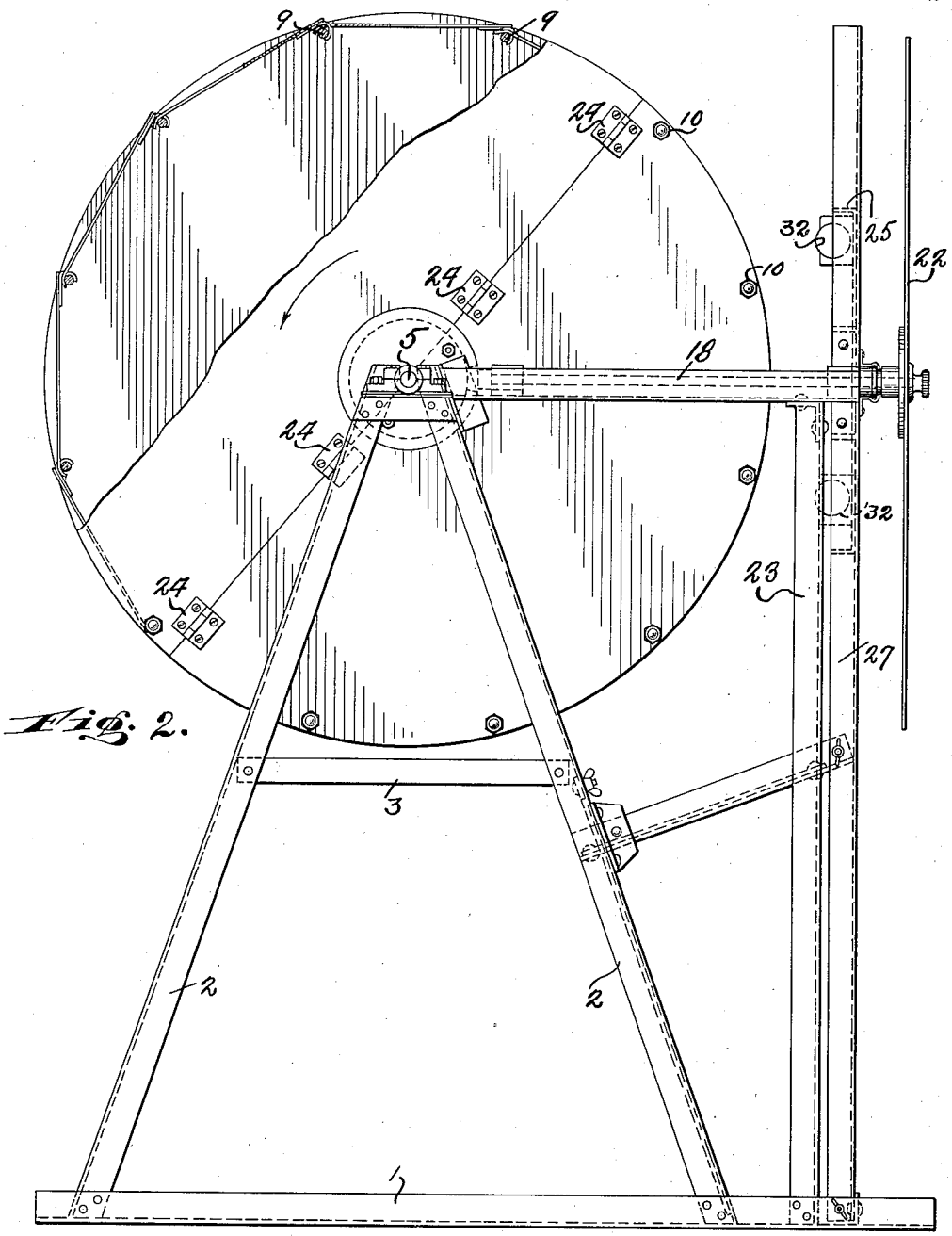

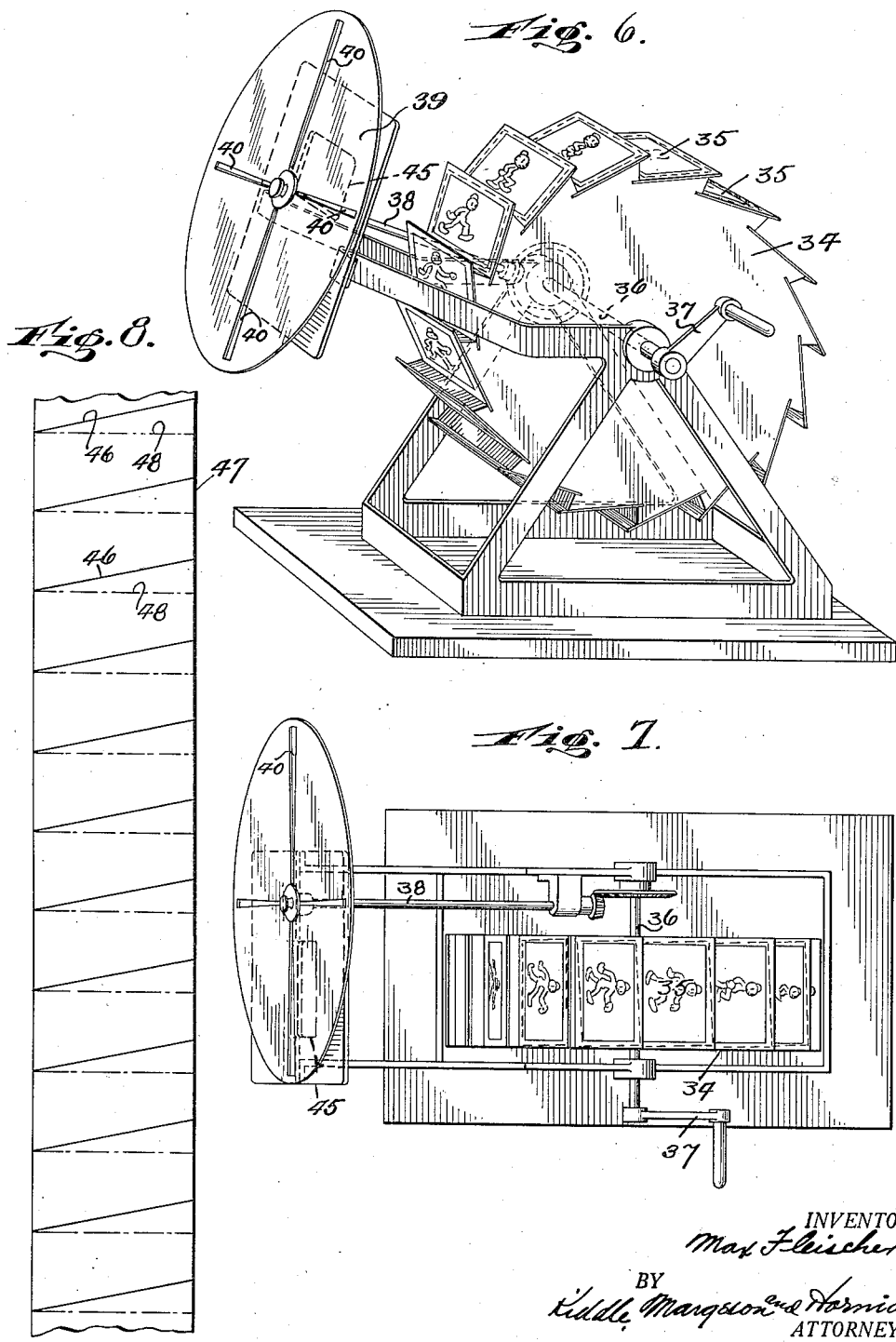

Patented Aug. 11, 1936

2,050,697

UNITED STATES PATENT OFFICE 2,050,697

PICTURE APPARATUS

Max Fleischer, Brooklyn, N. Y.

Application June 29, 1932, Serial No. 619,910

1 Claim. (Cl. 88—19)

This invention is directed to comparatively simple and inexpensive apparatus adapted for educational as well as amusement purposes, and has for one of its objects the provision of an apparatus useful for demonstration purposes in connection with talks and lectures on the making of commercial animated cartoons, my invention also providing apparatus whereby animated cartoons may be made and exhibited in the home.

Referring to the drawings in detail:

Fig. 1 is an elevational view of one embodiment of the invention;

Fig. 2 is a side elevational view of the embodiment of my invention as illustrated in Fig. 1;

Fig. 3 is a plan view of the apparatus of Figs. 1 and 2;

Fig. 4 shows a detail for the attachment to the apparatus of the cards carrying the cartoons;

Fig. 5 is a view of a modified apparatus;

Fig. 6 is a view of an apparatus of simplified construction and particularly well adapted for use as a toy or amusement apparatus;

Fig. 7 is a plan view of Fig. 6;

Fig. 8 is a plan view of a cartoon strip and

Fig. 9 shows a book having removable sections and particularly well adapted for use by the amateur.

At the outset I wish to note that it is frequently desirable to give talks and demonstrations on the making of animated cartoons from the lecture platform. Usually the speaker makes rough drawings and sketches by way of explanation of the various steps or operations entering into the actual making of animated cartoons; but it is quite difficult, however, satisfactorily to demonstrate to an audience the manner in which apparent motion is imparted to a series of drawings.

My improved apparatus as illustrated in Figs. 1, 2, and 3 is intended to assist the lecturer in his talk and to demonstrate in an understandable fashion the manner in which the drawings constituting a cartoon are handled so as to animate the objects appearing therein. This structure comprises a skeleton structure or frame of metal composed of side base members 1, struts 2 and cross bar 3 uniting the struts. The struts 2 are inclined toward each other so as to provide bearings for supporting the drive shaft 5, which may be held down in its bearings by readily removable plates 6.

The drive shaft 5 supports a pair of discs 7 and 8 of metal, for instance, arranged in spaced relation thereon and tied together by cross rods 9 held in place by nuts 10 so as to be quickly removable. The discs are hinged as shown at 24 so they may be collapsed. At the center of each of these discs and bolted thereto are hubs or bearings 11. These hubs form one side of a pair of couplings, the other members of which are designated 13 and 14, respectively.

The shaft 5 is driven conveniently by a handle 15 removably held on the shaft by screw 16. On the opposite end of the drive shaft 5 is a gear 17.

Extending from the top of the side frames provided by the base 1 and side members 2, at each side of the machine and parallel with the base 1, is an angle iron 18 and to one of these angle irons are secured bearings 19 for a shaft 20 which at its inner end is provided with a gear 21 meshing with the gear 17, this shaft at its outer end carrying a disc or shutter 22. The outer end of the angle iron 18 is supported by an upright 23 the base of which is removably secured to the base member 1.

In the front of the machine is a vertically extending panel 25 provided with an opening or aperture 26, this panel being supported by a pair of vertically extending channels 27 removably attached to the base pieces 1.

The disc or shutter 22 is provided with two radially extending openings 28. It is to be understood that the number of openings 28 may be varied depending upon the gear ratio between the rotor (the discs 7 and 8) and the disc or shutter 22.

The rods 9 bridging the two discs 7 and 8 which constitute the rotor of the machine afford a support for cards 29, carrying the cartoons to be displayed, and in order that these cards may be quickly placed in position and readily retained in place, the upper edge of each card is provided with a pair of hooks 30 adapted to permit the card to be suspended from the rods 9, the lower edge of each card being provided with openings 31 so that the cards may be placed on the machine with their ends overlapped.

For the purpose of illuminating the drawings on the cards 29 lamps 32 controlled by switch 33 are placed behind the panel 25. It will be appreciated, however, that the lamps 32 may be dispensed with if the aperture and disc be moved further away from the rotor.

In use, after the cards 29 have been attached to the rotor of the machine, the crank 15 is turned so as to rotate the rotor in the direction of the arrow on Fig. 2, turning of the crank 15 effecting, at the same time, rotation of the disc or shutter 22. As above mentioned the gear ratio between the drive shaft 5 and the shutter shaft 20 is predetermined so that the openings 28 through the shutter 22 come abreast of the aperture 26 in the front wall 25 at the proper instant, that is, as each picture is brought before the aperture 26 so that the objects drawn on the cards 29 are apparently animated as will be understood. If desired sprocket holes shown at *s* may be drawn on the cartoon cards 29.

From the foregoing it will be seen that I have provided a machine particularly well adapted for lecture purposes, in that my apparatus demonstrates in a very simple way the manner in which motion is apparently imparted to a series of drawings. It will be appreciated, furthermore, that my apparatus is particularly useful for lecture and demonstration purposes in that it may be readily taken down and packed in a small compass for transportation purposes.

While I have shown the cartoons drawn on separate cards, it will be understood of course that a continuous strip may be employed if desired, which may simply be wrapped about the rotor.

In the apparatus shown in Figs. 6 and 7 I have shown a construction primarily intended for home use although if built on a sufficiently large scale it too may be used for demonstration purposes. In this form or embodiment of my invention I show a rotor 34 adapted to receive cards 35 with the pictures drawn thereon, these cards being slipped into slits provided for that purpose in the discs making up the rotor 34. Here again a continuous strip of drawings may be employed, if desired, the strip being wrapped about the rotor 34. As in the machine already described a drive shaft 36 is provided, driven from a handle 37 and geared to a shutter shaft 38 carrying shutter 39 with radial slits 40 therein which rotates in front of stationary aperture 45. It will be noticed that I have provided four slits in this shutter, and it will be appreciated that the ratio between the shafts 36 and 38 is such that each time one of the slits moves across the front of the aperture 45 a picture will be moving across the back of the aperture. Inasmuch as it is desirable to make this machine as compact as possible, the disc 39 is relatively small in diameter and consequently the aperture 45 is close to the axis of rotation of the disc. As the slots 40 sweep across the aperture 45 the pictures carried by the rotor 34 will appear to be pitched downwardly from left to right. To compensate for this I propose to draw the pictures on a slight upward slant as represented by the full lines 46 of Fig. 8, which represents a cartoon strip, the pictures when viewed through the slots 40 appearing horizontal as represented by the broken lines 48 of the same figure.

In Fig. 9 I have shown a bound set 41 of drawings, in the form of removable sections 42, these sections to be torn out and placed in the machine of Fig. 5 to enable a child, for instance, to exhibit its own cartoons.

In Fig. 5 I have modified the mode of attaching the cards to the rotor of either machine. It will be seen from this figure that I provide in place of the rods 9 of Fig. 3, for instance, channel members 43 into which the cards may readily be slipped and thereby retained in place.

As above mentioned the cartoons may be made on cards, may be in book form as shown in Fig. 9, may be in a roll or may even be published in strip cut-out form in newspapers and magazines. It will be understood that where the cartoons or pictures are in a strip, it will be necessary merely to wrap the strip about the periphery of the rotor of the machine and fasten the ends in place in any convenient fashion.

What I claim is:—

In a machine of the class described, the combination of a knock-down frame or stand, a collapsible rotor, means for attaching a plurality of pictures thereto for rotation therewith, a drive shaft for the rotor removably mounted in said stand, a second drive shaft geared to the first mentioned shaft, and a slotted disc removably mounted on the second shaft so as to be disposed in front of said rotor, said disc being rotatable in a plane at right angles to the plane of rotation of the pictures carried by said rotor.

MAX FLEISCHER.